No. 750,415. PATENTED JAN. 26, 1904.
W. VOLKHARDT.
HYDRANT.
APPLICATION FILED APR. 17, 1903.
NO MODEL.
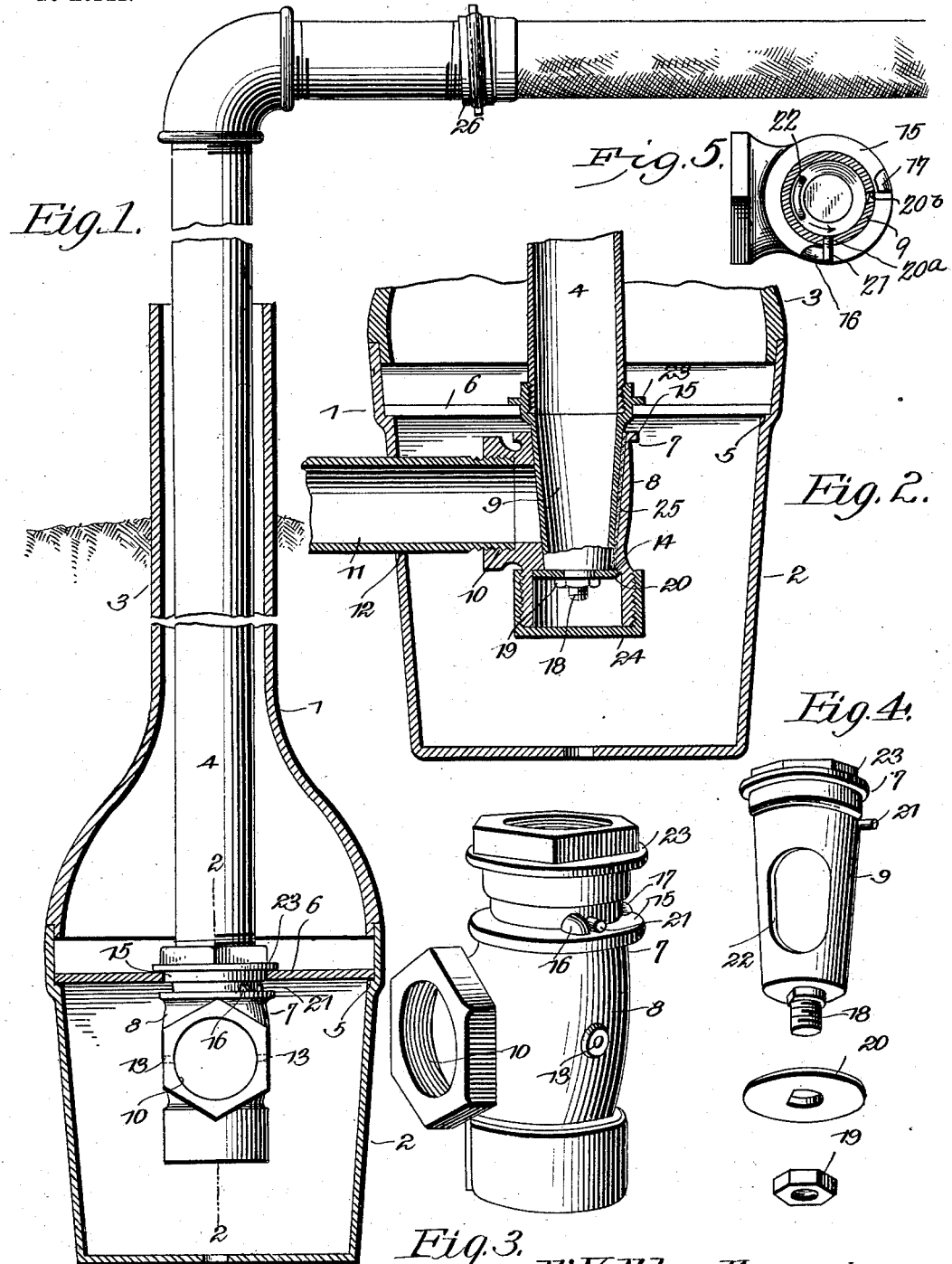

No. 750,415.

Patented January 26, 1904.

UNITED STATES PATENT OFFICE.

WILLIAM VOLKHARDT, OF STAPLETON, NEW YORK.

HYDRANT.

SPECIFICATION forming part of Letters Patent No. 750,415, dated January 26, 1904.

Application filed April 17, 1903. Serial No. 153,140. (No model.)

*To all whom it may concern:*

Be it known that I, WILLIAM VOLKHARDT, a citizen of the United States, residing at Stapleton, in the county of Richmond and State of New York, have invented a new and useful Hydrant, of which the following is a specification.

My invention relates to hydrants, and has for its objects to produce a device of this character which will be simple of construction, efficient in operation, one which is especially applicable for use as a fire-hydrant, and one which in practice will be free from the liability of freezing.

To these ends the invention comprises the novel details of construction and combination of parts more fully hereinafter described and claimed.

In the accompanying drawings, Figure 1 is a vertical sectional elevation through my improved device. Fig. 2 is a similar view, on an enlarged scale, on the line 2 2 of Fig. 1. Fig. 3 is a detailed perspective view of the barrel and attendant parts assembled. Fig. 4 is a similar view of the key and its securing washer and nut. Fig. 5 is a top plan view, partly in section, of the barrel and key assembled.

Referring to the drawings, 1 indicates the outer protecting casing of my improved device, and consists of the lower body portion 2, which receives the controlling-valve of the apparatus, and an upper portion 3, which extends upward to the ground-surface for containing and protecting the stand-pipe 4. The lower portion 2 of the casing is provided near its upper end with an inner flange or ledge 5, which receives and sustains a platform 6, which in turn supports the controlling-valve 7.

The controlling-valve comprises an outer barrel or casing 8 and an inner tapered key or turn-plug 9, which fits snugly in a similarly-tapered central opening or seat within the barrel 8. The barrel is provided at one side with an inner screw-threaded opening 10, into which is tapped the inner end of the street main or pipe 11, which enters the main casing 1 through an opening 12 at the side thereof. The barrel is further provided with small drain-openings 13 formed through its sides, with a central opening 14 formed through its lower end, and with an upper flange 15, provided with upwardly-projecting lugs 16 17. The purpose of all of these parts will hereinafter appear.

The inner key 9 is in the form of a tapered metal shell, provided at its lower end with a threaded central stem 18, which projects through the central opening 14 in the bottom of the barrel or casing 8 and receives a nut 19 and an interposed washer 20, through the medium of which the key is secured for rotation within the barrel. The central perforation of the washer 20 is flattened at one side to correspond with a similar flattened portion of the cylindrical stem 18, thus preventing rotation of the washer upon the stem and obviating loosening of the nut 19, owing to the turning of the key 9 within its casing. The key 9 is provided in its side wall near its upper end with a pair of intermediate screw-threaded openings $20^a$ $20^b$, into either of which may be tapped the inner end of a projecting stud 21, which rides upon the flange 15 of the casing 8 in position to engage with the lugs 16 17, by which the turning of the key within its casing is limited for the purpose hereinafter explained. The key is further provided through its side wall with an opening 22, which as the plug is turned in its casing is moved into or out of register with the opening 10, thus serving when in the latter position to cut off or check the flow of water from the main 11 or when in the former position to permit the water to flow from said main into the key and through the same to the stand-pipe 4, the lower end of which is tapped into the upper end of the key. The key is also provided with an upper horizontal flange 23, which when the parts are in the assembled position projects outward beyond the body portion or casing 8 and engages with or rests upon the platform 6 for sustaining the valve as a whole centrally within its protecting-casing 1.

24 indicates a protecting shield or cap which is tapped onto the lower end of the barrel 8 for the purpose of protecting the projecting stem 18 of the key 9 and the nut and washer upon the stem from grit or the like which may find its way into the outer casing 1.

25 indicates a groove formed longitudinally of the inner wall of the barrel 8 for the purpose of receiving and containing a supply of lubricant to facilitate turning of the key within its seat.

The stand-pipe 4, which extends upward from the controlling-valve within the upper portion 3 of the protecting-casing, projects a suitable distance above ground and is provided with a hose-coupling 26. This stand-pipe is free to rotate for the purpose of rotating the key 9 to permit or check the flow of water from the main through the stand-pipe, the movement of the key 9 by the stand-pipe being properly regulated through the pin 21, engaging with the respective studs 16 17. In this connection it is to be noted that when the key is turned to bring its opening 22 into register with the opening 10, as shown in Fig. 5, flow of water from pipe 11 to pipe 4 is permitted and that stud 21 will then contact with lug 16 and that when the key is rotated until stud 21 contacts with lug 17 the opening 22 will be moved out of register with opening 10 and flow of water will be checked, while at the same time the opening 22 will be brought into position for the stand-pipe and key to drain through the adjacent drain-opening 13. It is further to be noted that when the stud 21 is seated in opening $20^a$, as shown in Fig. 5, the movement of the stand-pipe for opening the valve will be from right to left and that by engaging the stud with the opening $20^b$ the spring movement of the stand-pipe will be from left to right, thus permitting the ready change of the parts to vary the movement necessary for opening the valve, as circumstances may in practice require.

From the foregoing it will be seen that I produce a simple and efficient mechanism which is admirably adapted for the attainment of the ends in view, and it is to be understood that I do not limit myself to the precise details herein shown and described, inasmuch as minor changes in the form, proportions, and manner of assemblage of the parts may be made without departing from the spirit of my invention.

Having thus described my invention, what I claim is—

In a hydrant, the combination with an outer protecting-casing, of a platform sustained therein, a valve comprising an outer barrel and an inner rotatable hollow plug or key, a flange associated with the key for engagement with the platform to sustain the valve within the casing, a main or conduit extending into the casing and connected with the barrel, and a stand-pipe connected with the key, said pipe being operable for rotating the key to establish communication through the latter between the conduit and stand-pipe.

In testimony that I claim the foregoing as my own I have hereto affixed my signature in the presence of two witnesses.

WILLIAM VOLKHARDT.

Witnesses:
SAMUEL JEFFERSON,
CHAS. F. PARET.